United States Patent Office 3,453,041
Patented July 1, 1969

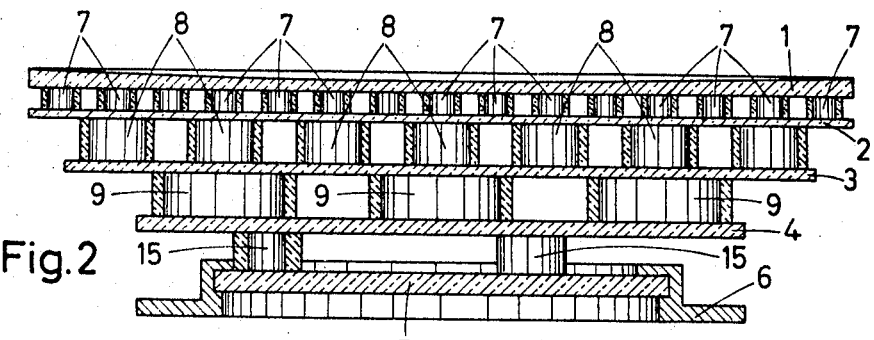
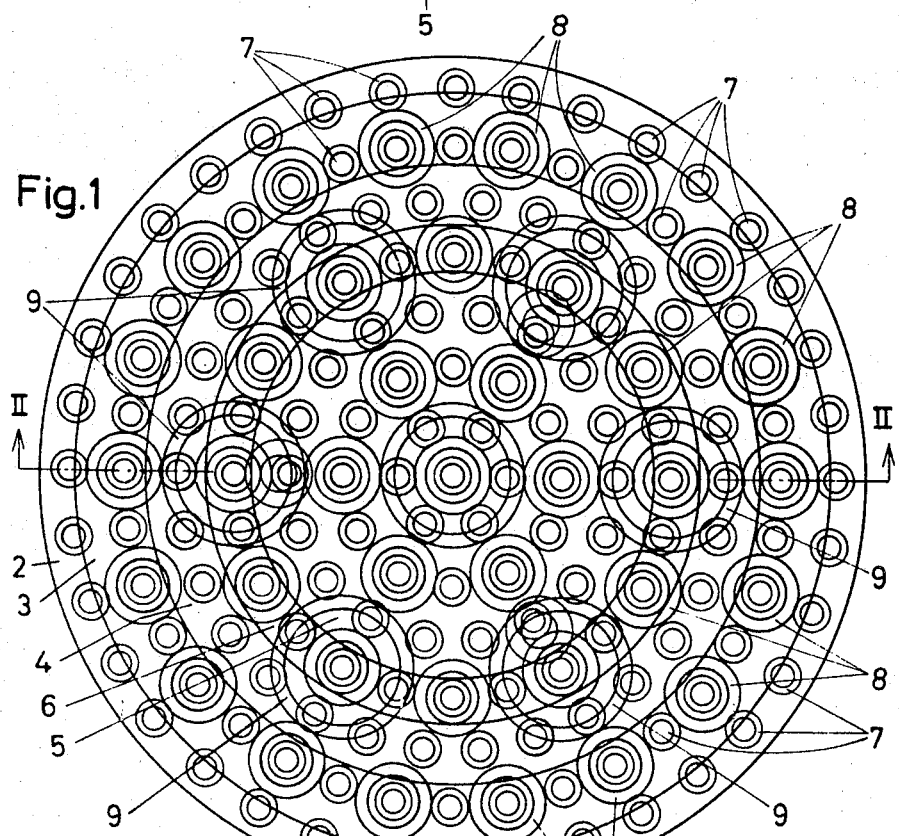
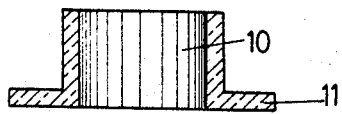

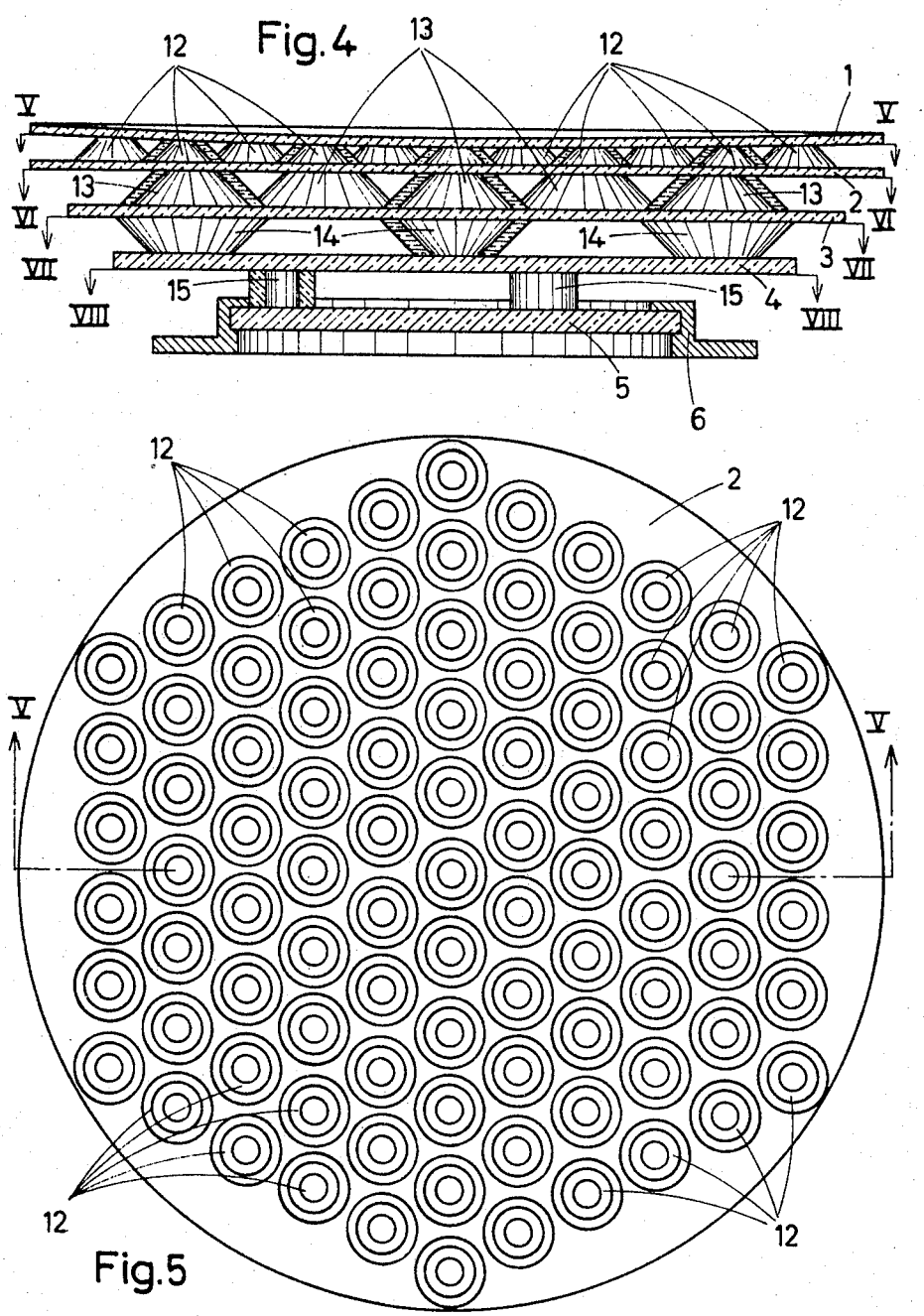

3,453,041
LIGHT-WEIGHT OPTICAL MIRROR FOR ASTRONOMICAL EQUIPMENT
Kurt Räntsch, Heidenheim am Brenz, Germany, assignor to Carl Zeiss-Stiftung, doing business as Carl Zeiss, Heidenheim am Brenz, Wurttemberg, Germany, a corporation of Germany
Filed Aug. 21, 1967, Ser. No. 661,906
Claims priority, application Germany, August 20, 1966, Z 12,388
Int. Cl. G02b 5/08
U.S. Cl. 350—310                                      6 Claims

ABSTRACT OF THE DISCLOSURE

A light-weight optical mirror for astronomical equipment in which a relatively large, but thin reflecting plate is supported on its back face by a multilayer system of spaced carrier plates between which are disposed a series of circular spacer memebrs, at least said reflecting plate and said carrier plates consisting of the same material.

---

This invention relates to an optical mirror, more particularly for astronomical equipment, of light-weight design.

According to the heretofore customary method of construction concave or plane mirrors for optical purposes are produced as thick plates as by casting, the optically unused back of the mirror surface being sometimes designed as a honeycomb or ribbed structure in order to save weight, as it is also common practice in the case of large cast-iron bodies.

In spite of the aforesaid measures for weight saving mirrors of the type indicated, for instance, employed by great observatories, still have a weight up to several tons, a fact which naturally entails considerable requirements on the support of the mirror and the operating mechanism thereof (compensating weights, etc.).

Also when using smaller mirrors, such as, for instance, in space research, a saving of weight is of great significance.

It is the object of this invention to provide means of a type, which permit an optical mirror to be constructed such as to be of particularly light weight and still complying with all optical requirements concerning the accuracy of the optical imaging and furthermore possesses the stiffness required under all conditions of use, when applied optically and also in the working processes.

The optical mirror according to this invention, more particularly for astronomical equipment, is characterized in that a relatively thin reflecting plate which may be plane or curved, is supported by a multilayer system of plane, relatively thin carrier plates with a plurality of annular bodies interposed therebetween, at least the reflecting plate and the carrier plates consisting of the same material.

In this manner, the reflecting plate having the optical surface may be provided such as to be quite substantially thinner than with the customary method of construction, the sum of the thicknesses of all glass plates including the annular bodies being substantially less than the self-supporting reflecting plate in the astromirrors of conventional design. In addition, with the embodiment according to this invention the mount of the total mirror may be adapted to be substantially simpler, since the same need not engage the reflecting plate, a fact which in general has hitherto frequently given rise to inconveniences due to the strong difference in the coefficients of thermal expansion of the holder material (for instance, metal) and of the reflecting plate (for instance, glass or quartz glass). According to this invention the holder for the mirror suitably engages one of the carrier plates, and that is advantageously the last carrier plate being the farthest removed from the reflecting plate, but at any rate, does not directly engage the reflecting plate itself.

In the practical-constructive embodiment of an astromirror of the light-weight design according to this invention the supporting elements are rigidly connected with, suitably cemented or welded to, the carrier plates. The supporting elements consist of the same material having the lowest possible coefficient of thermal expansion, as the carrier plates themselves, thus they suitably consist, for instance, of quartz glass, Invar or the like. For space traveling purposes also beryllium may be used.

With an embodied form of an optical mirror of the type indicated, according to a further idea of this invention the reflecting plate and the carrier plates are respectively supported against each other by a plurality of annular elements distributed fairly regularly across the whole surface thereof, which elements decrease in number with increasing distance from the reflecting plate and serve as spacers, each annular element of a successive plate in the closer vicinity thereof supporting on a plurality of rings in the preceding plate gap.

In an illustrative embodied form the supporting elements between the plates, in the simplest case, comprise cylindrical rings, the number of which decreases by a factor of about 4–6 from one supporting plate to another one with increasing distance from the reflecting plate, the distribution being effected from plate to plate in a manner such that the cylinder surfaces of the rings in the gap above one plate and the cylinder surfaces of the rings in the successive plate gap are at least partly directly seated on each other, with this plate interposed therebetween, so that the plates themselves are subjected to the least possible bending and any diaphragm effect is substantially eliminated.

The supporting elements between the plates may also be cylindrical rings formed with flanges on one side or both sides thereof for the purpose of greater support on the plates.

In the following description a few embodied forms of optical mirrors according to this invention will be described with reference to the accompanying drawings, in which:

FIG. 1 is a top view of a mirror assembly consisting of glass or quartz glass with the reflecting plate 1 removed;

FIG. 2 is a sectional view along the line II—II of FIG. 1;

FIG. 3 illustrates one of the cylindrical supporting rings having a flange projection;

FIG. 4 is a sectional view of an optical mirror, wherein the supporting elements consist of truncated cones;

FIG. 5 is a sectional view of the mirror along the curved line V—V of FIG. 4;

Figure 6:
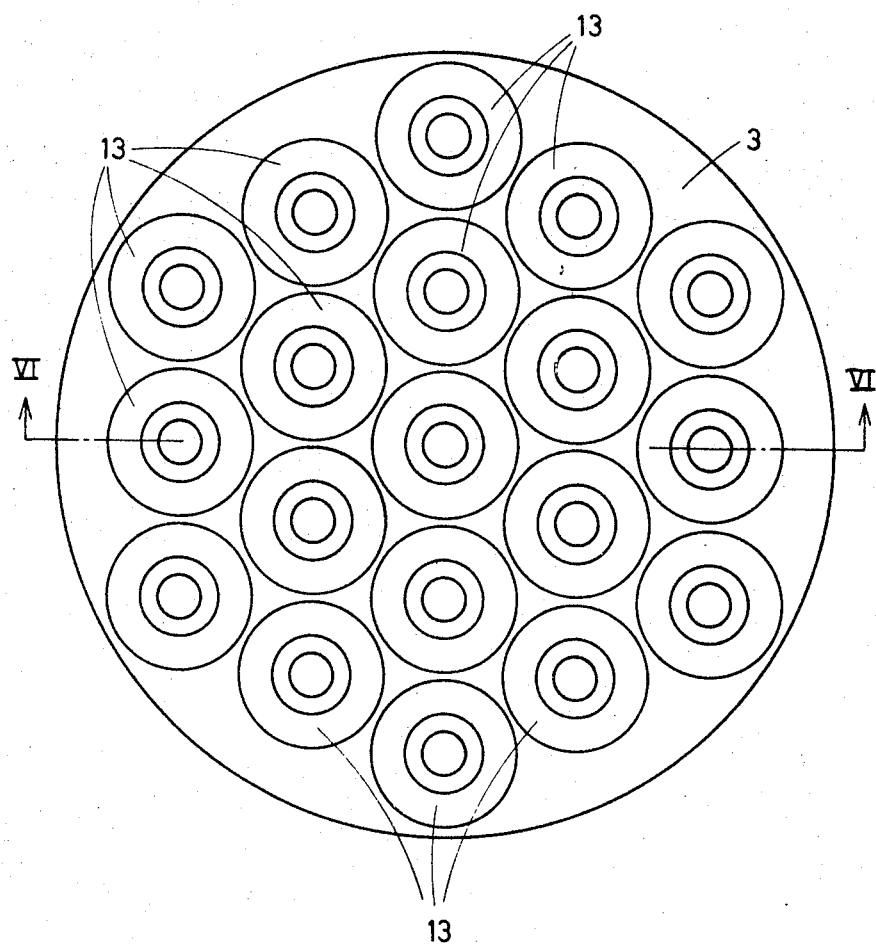
FIG. 6 is a sectional view of the mirror along the line VI—VI of FIG. 4.
Figure 7:
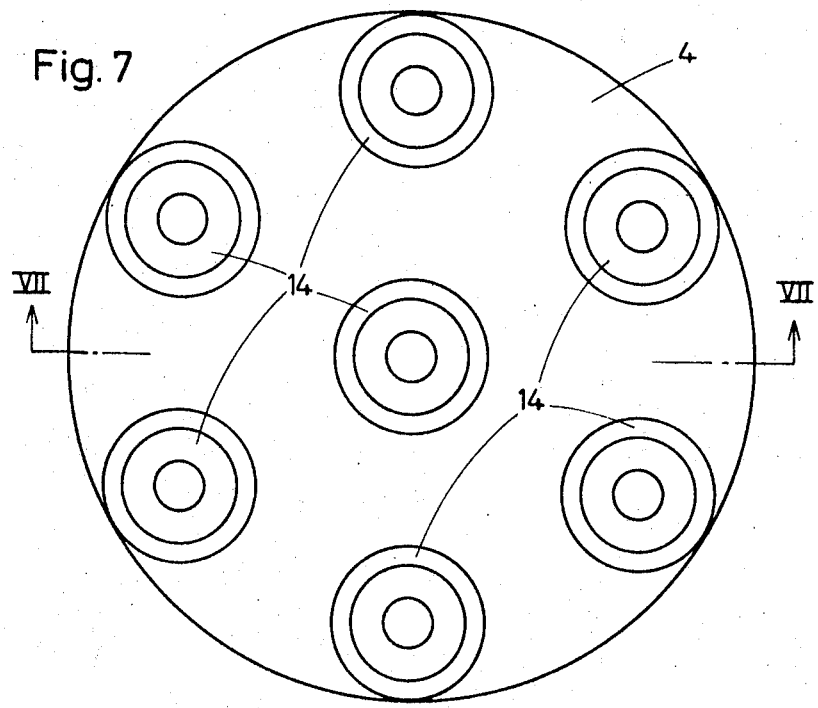
FIG. 7 is a sectional view of the mirror along the line VII—VII of FIG. 4.
Figure 8:
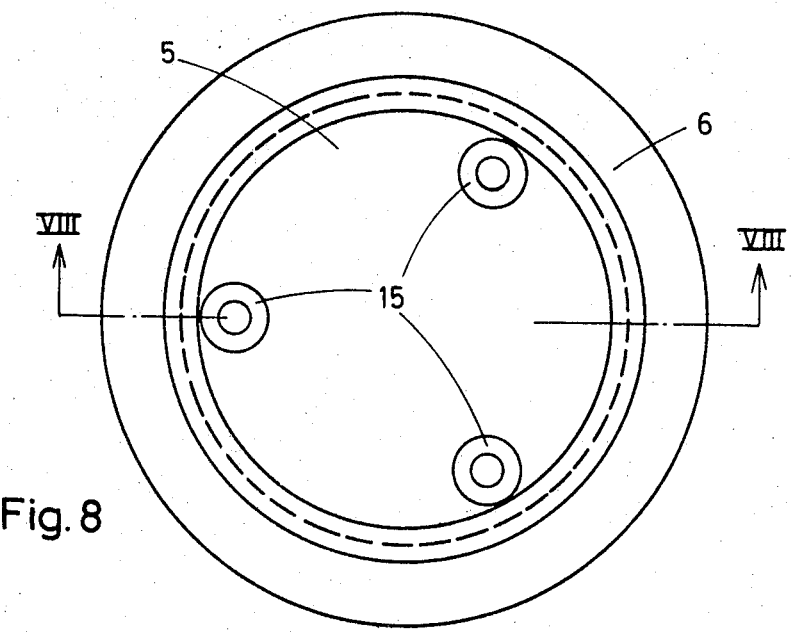
FIG. 8 is a sectional view of the mirror along the line VIII—VIII of FIG. 4.

Referring to the drawings, reference numeral 1 designates the reflecting plate which in both embodiments shown in FIGS. 2 and 4 has its top face provided with a curved optically active reflecting surface which may, however, also be plane. Numeral 2 designates a supporting plate arranged adjacently the reflecting plate 1, the successive one is referenced 3, a still further one is referenced 4 and the last one of the illustrated supporting plates provided four times is referenced 5, the holder and mount of the mirror being illustrated by an annular flange 6. Reference numeral 7 designates a plurality of cylindrical annular bodies as supporting bodies arranged in the space between the reflecting plate 1 and the supporting plate 2, numeral 8 designates the cylindrical annular bodies arranged between the supporting plates 2 and 3, and numeral 9 designates the annular bodies arranged between the supporting plate 3 and the supporting plate 4. Instead of the annular cylindrical tubular pieces 7, 8 and 9 there may also be used cylindrical supporting bodies 10 having a flange projection 11 for increasing the effective width of the support according to FIG. 3. As shown, the thickness of the plates 2, 3 and 4 increases from plate to plate in a manner such that the respective thickness thereof is about twice the preceding one. With the further illustrative embodied form according to FIGS. 4 to 8 both the reflecting plate 1 and also the supporting plates are carried by a plurality of hollow truncated cones 12, 13 and 14, the base angle of which is, for instance, about 60°. The wall thickness thereof is about equal to the thickness of the respective upper plate which they carry, the last carrier plate 4 the farthest removed from the reflecting plate 1 being provided with truncated cones 14 of corresponding wall thickness in inverted position.

In FIGS. 2 and 4 the plate 4 is respectively carried by a last plate 5 with cylindrical annular bodies 15 being interposed between the plates 4 and 5. This last plate is engaged by an annular flange 6 for mounting the mirror assembly.

What I claim is:
1. In a light-weight optical mirror device, a thin reflector plate having a reflecting front face and a rear face, a plurality of carrier plates in spaced relation to each other and to said rear face of the reflector plate, a plurality of spacing elements of annular cross-section substantially uniformly distributed between said reflector plate and the closest of said carrier plates, and a decreasing number of spacing elements of annular cross-section substantially uniformly distributed between succeeding carrier plates, said reflector plate and carrier plates being made of the same material, each of said annular elements of a successive plate being supported by a plurality of rings in the preceding plate space.

2. An optical mirror device as set forth in claim 1, in which said spacing elements are rigidly connected with the plates.

3. An optical mirror device as set forth in claim 1, in which said spacing elements are provided at least at one end with a radially extending flange to increase the support area.

4. An optical mirror device as set forth in claim 1, including a holder and mount engaging one of said carrier plates, namely the last carrier plate which is farthest removed from said reflecting plate.

5. An optical mirror device as set forth in claim 1, in which the number of spacing elements between succeeding plates decreases by a factor of about 4–6 with increasing distance from said reflector plate.

6. An optical mirror device as set forth in claim 1, in which said spacing elements of annular cross-section are in the form of truncated cones having a top diameter equal to about one half of the base diameter, the thickness of said carrier plates increasing with the distance from the reflector plate and the truncated cones between the two carrier plates farthest from the reflector plate being inverted and having a wall thickness about half of that of the last carrier plate.

References Cited
UNITED STATES PATENTS

| 408,511 | 8/1889 | O'Brien | 350—310 |
| 2,988,959 | 6/1961 | Pelkey et al. | 350—310 X |

FOREIGN PATENTS 309,236  4/1929  Great Britain.

DAVID SCHONBERG, *Primary Examiner.*

R. L. SHERMAN, *Assistant Examiner.*